2,860,062

MODIFIED PROTEIN PREPARATION

Harold K. Salzberg and Walter B. Kinney, Bainbridge, N. Y., assignors to The Borden Company, New York, N. Y., a corporation of New Jersey No Drawing. Application January 11, 1954
Serial No. 403,426

2 Claims. (Cl. 106—146)

The invention here disclosed is a process for improving the physical and chemical properties of casein, especially casein cements, by the procedure of roll milling moist casein on hot differential rolls to increase the solubility of the casein and increase its body and viscosity.

Briefly stated, the invention comprises milling aqueous casein, soy protein, or like protein with formaldehyde by differential speed rollers at elevated temperatures.

In practicing the invention, the raw protein may be any of the usual casein substances as derived mainly from cows' milk; or may be extracted and dried soy bean protein; or may be commercial dried whole blood, preferably in granular form. These are the most satisfactory sources of protein for the present process, but many other forms of protein are available and may be used.

When the desired protein is ready for processing, it is first moistened with water to a slightly damp state. The amount of water is important, the usual minimum amount for most proteins being about 10%, although some caseins may require as little as 3½% of water. Care must also be exercised not to put in too much, since if too much water is used, the material becomes merely a slurry which cannot be rolled for the reason it has insufficient body for the rolls to work on. For most proteins, the maximum amount of water is about 50%. The casein is preferably allowed to stand at least until the moisture is reasonably well disseminated through the batch of casein. Most caseins will show sufficiently good distribution of moisture to permit of rolling within a time as short as one minute. Care must be exercised, however, not to let the protein soak for too long a time since prolonged soaking may lead to the development of mold or other destructive bacterial growth. For most storage situations and with most proteins, the maximum storage time of the moist protein is about 24 hours, although of course, if precaution is taken to sterilize the moist mixture, considerably longer times of storage can be had. At a convenient time during the storage period, the moistened protein may be taken out of storage and placed on the rolls. This device is preferably the standard double roll mill with the rolls in the same horizontal plane, with adjustments for the roll spacing. Adequate driving power is required, and the amount is of about the same order of magnitude as is required for milling rubber, although in some instances it may be substantially less. The rolls are provided with heating means, such as low pressure steam, sufficient to bring the roll temperatures within the range between about 100° F. and 230° F. It is desirable that the peripheral speeds of the rolls be different, which may be obtained with rolls of the same diameter driven at different speeds or by rolls of different diameters driven at the same speed. The useful range of speeds lies between a ratio of 1 to 1.2 and a ratio of 1 to 4. The clearance between rolls conveniently ranges from 0.06" to 0.25", a particularly satisfactory roll separation being 0.12". With the rolls in motion at the normal roll speed, set for the proper spacing and heated to the proper temperatures, the moist casein may be placed in the nip of the roll. It may be noted that the first portions of casein go through the nip of the rolls and drop into a tray underneath, from which they may be scooped up and returned to the nip of the rolls. In due course, however, the casein becomes gummy and coherent and drops through in the form of a sheet which may be brought around the front roll and returned to the nip of the roll thereby "banding" on the roll. It is desirable for the present invention that the protein shall be milled until it has "banded" and that milling shall be continued under "banding" conditions for a substantial period of time until the sheet is converted to a horny semi-translucent film. Normally less than one minute is required to obtain the "banded" condition, and normally the rolling is completed in three or four minutes. Occasionally, with some caseins the "banding" and rolling may be completed in a shorter time, as 1½ to 2 minutes, and occasionally for some particularly stubborn proteins, the rolling may need to be extended to intervals as long as 10 minutes, 12 minutes or even 15 minutes, this being particularly the case with poor caseins which need a maximum of up-grading.

When the sheet has assumed a good degree of plasticity and a good degree of semi-translucency, it may be regarded as finished. The exact criteria of rolling time depends upon the degree of improvement being sought. Mere sheet formation may be sufficient to improve the solubility of the casein. On the other hand, prolonged milling after sheet formation may be desirable if a particularly tough casein is wanted for gluing purposes. Economic considerations relating to power consumption dictate the dwell time of the casein on the rolls and we do not consider it advantageous to mill the sheet, once formed, longer than about 10 minutes. Experience with the different grades of casein and the improvement sought, determine the degree to which the sheet shall be worked on the rolls, once formed.

When the rolled sheet reaches the desired condition, it may be cut across to free it from the rolls, flattened, and cooled. Under these conditions, the sheet is a hard, horny, semi-translucent material of considerable hradness, almost wholly lacking in grain or other texture. When the sheet is cold, it is desirably broken up into small fragments and ground into a powder. It is preferable that it be ground sufficiently fine to pass 95% through a 30-mesh sieve. The resulting processed casein is suitable for any of the uses to which high grade raw casein would be put, and to many uses for which ordinary casein is unsuitable. It is particularly readily soluble, shows an excellent body when in solution, and is particularly suitable for the making of casein adhesives.

The preparation of aqueous solutions of casein or other commercial protein is usually accomplished by supplying alkali in an amount varying with the strength of the alkali. For instance, borax is commonly employed as a reference alkali in stating the solubility of casein, some particularly high grades of casein requiring only 12 parts of borax to 88 parts of casein, whereas grades of low solubility may require up to 20 parts or more of borax to 80 parts of casein. It is one object of this invention to up-grade caseins of low solubility to a higher degree of solubility.

The viscosity of aqueous solutions of proteins is a property of vital importance in gluing operations. High viscosity in water solution is one attribute of proteins which makes them so valuable as glues. It is one object of this invention to increase the viscosity of casein or other protein by the process of milling to impart unusually valuable gluing characteristics. The final objective is the improvement in adhesive strength of the glue,

Example 1

A domestic casein was selected for an experiment in which the only variable was the moisture content of the casein. Maintaining the temperature of the rolls at 160° F. for the faster roll and 145° F. for the slower roll, this casein was rolled after wetting with increasing amounts of water in the range 10% to 40%, dry casein basis. All of these caseins readily produced sheets which were worked in the nip of the rolls for 2 to 3 minutes after sheet formation. The sheets were broken up, and the product dried and ground to pass 30 mesh. That there had been a change brought about in the molecular weight of the caseins was evident in viscosity measurements, and the extent and direction of this change had evidently been determined by the moisture content of the casein at the time of working. The results of Test No. 3 show that a thickening effect on the casein in water solution had occurred and that the extent of change is dependent upon the moisture present. The results of Test No. 4 wherein the same products are dissolved in formamide in the absence of water indicate that the effect of the heat and friction of rolling in the presence of water is really one of a molecular splitting, suggested by a reduction in the intrinsic viscosity of the casein, and again the effect is dependent upon the proportion of water to casein.

|  | Test No. 3 | Test No. 4 |
| --- | --- | --- |
|  | Viscosity in Water, cp. | Efflux Time of Formamide Solutions, seconds |
| Unprocessed casein | 295 | 195 |
| Casein rolled with 10% water | 580 | 50 |
| Casein rolled with 20% water | 370 | 42 |
| Casein rolled with 30% water | 435 | 23 |
| Casein rolled with 40% water | 395 | 45 |

The above examples show the improvements to be gained by simple roll processing of the raw casein. The advantages thus obtained can be further increased by rolling into the casein various auxiliary agents. For instance, formaldehyde is an excellent solubilizer and improver when rolled into the raw casein.

Example 2

It is sometimes desirable to thicken or "body up" a protein dispersion in water when it is to be used as a glue in assemblies where little or no pressure or clamping is applied. To accomplish this the glue may comprise some casein from cooked curds. The cooking operation is a laborious procedure and only possible in plants having skim milk available for making casein. The effect of additions of formaldehyde to protein dispersions in water is also one of thickening but such additions cannot be practiced with assurance of success in the usually highly alkaline casein glues. It therefore appeared that a treatment of the protein on the rolls with formaldehyde might accomplish the proper degree of thickening prior to formulating the glue. A product was made in this manner, from a mixture of casein and soy protein isolated by extracting from soybean meal. Two and one-half lbs. of casein were mixed with 2.5 lbs. of soy protein and the mixture wetted with 815 cc. of water containing 10 cc. of 37% formalin in solution. This proportion of formaldehyde corresponds on the anhydrous basis to approximately 1.8% of the combined weight of the two proteins. With the differential rolls at 150° F. and 100° F. this mixture formed a sheet on the rolls very readily. The sheet was allowed to cool, broken up, dried and ground.

A dry glue mixture was prepared wherein 20 parts of the product was diluted with 80 parts of ordinary raw Argentine casein. The fluidity values of the experimental glue show a normal thickening and gel formation for this type of glue. The wet shear strength value for the experimental glue is several times that of the ordinary glue and is as high as normally attained with special grades of cooked casein.

|  | Experimental Glue | Ordinary Glue |
| --- | --- | --- |
| Fluidity (Stormer R. P. M.), Initial | 22 | 34 |
| Fluidity after 3 hours | 7 | 16 |
| Fluidity after 24 hours | Gel | Gel |
| Wet Shear—av. p. s. i. | 157 | 36 |

The process of the present invention also is highly valuable for blending and improving the quality of blended protein mixtures. For instance, a relatively low grade casein and a soy protein may be blended and the properties of the blend simultaneously improved by mixing and milling on the rolls as above outlined.

The invention will be further illustrated by description in connection with the following specific examples of the practice of it.

Example 3

Five hundred lbs. of a mixture of equal parts of Argentine casein and soy protein were wetted with water containing one percent of formalin, based on the dry protein weight, and rolled through two pairs of differential rolls of large production size. The faster roll of the fore pair of rolls was maintained at a temperature of 130° F. and the slower roll was not warmed. The clearance between this pair of rolls was 0.115" as determined by the lead sheet method. The clearance was 0.062". After formation on the fore rolls the sheets were dropped to the nip of the cold rolls and merely run through these rolls to thin out the sheets and cool them. After breaking up the sheet and drying, the product was ground to a powder. This processing thickened the protein, probably through an increase in molecular weight caused by a cross-linking action of the formaldehyde. The extent of change is shown by capillary tube efflux times for the processed and unprocessed proteins in 1% solution in C. P. lactic acid.

Seconds
Unprocessed protein mixture _____ 31.0
Processed protein mixture _____ 45.6

While there are above disclosed but a limited number of embodiments of the present invention, it is possible to provide still other embodiments without departing from the inventive concept herein disclosed; and it is therefore desired that only such limitations be imposed upon the appended claims as are stated therein or required by the prior art.

The invention claimed is:

1. In increasing the viscosity and solubility of a protein in water, the process which comprises moistening a protein selected from the group consisting of casein and soy protein with water in the proportion of about 3.5–50 parts by weight of water for 100 of the protein, the amount of water within this range converting the protein to dampened non-slurried condition, mixing formaldehyde with the protein in the proportion of about 0.37–1.8 parts by weight of formaldehyde on the anhydrous basis for 100 of protein, subjecting the resulting mixture to milling at 100°–230° F. between differential speed rollers, continuing the milling until the milled material assumes a horny appearance, then discontinuing the milling, and pulverizing the resulting product.

2. The process of claim 1 in which the protein used is casein.

References Cited in the file of this patent

UNITED STATES PATENTS 1,211,526     Bartels _____ Jan. 9, 1917

(Other references on following page)

UNITED STATES PATENTS

| | | |
|---|---|---|
| 1,333,968 | Francis | Mar. 16, 1920 |
| 1,423,256 | Rice | July 18, 1922 |
| 1,513,139 | Trumbull | Oct. 28, 1924 |
| 2,279,096 | Sparre | Apr. 7, 1942 |

FOREIGN PATENTS 494,049  Great Britain _____ Oct. 19, 1938

OTHER REFERENCES

Gottlob's "Technology of Rubber," London 1927, pp. 101–4.